Feb. 25, 1964

J. P. MUKHERJI 3,122,157

ADJUSTABLE FLUID FLOW CONTROL DEVICE

Filed July 28, 1960

INVENTOR
Jyoti Prasad Mukherji
BY
Michael S. Striker
ATTORNEY

Feb. 25, 1964  J. P. MUKHERJI  3,122,157
ADJUSTABLE FLUID FLOW CONTROL DEVICE
Filed July 28, 1960  3 Sheets-Sheet 2
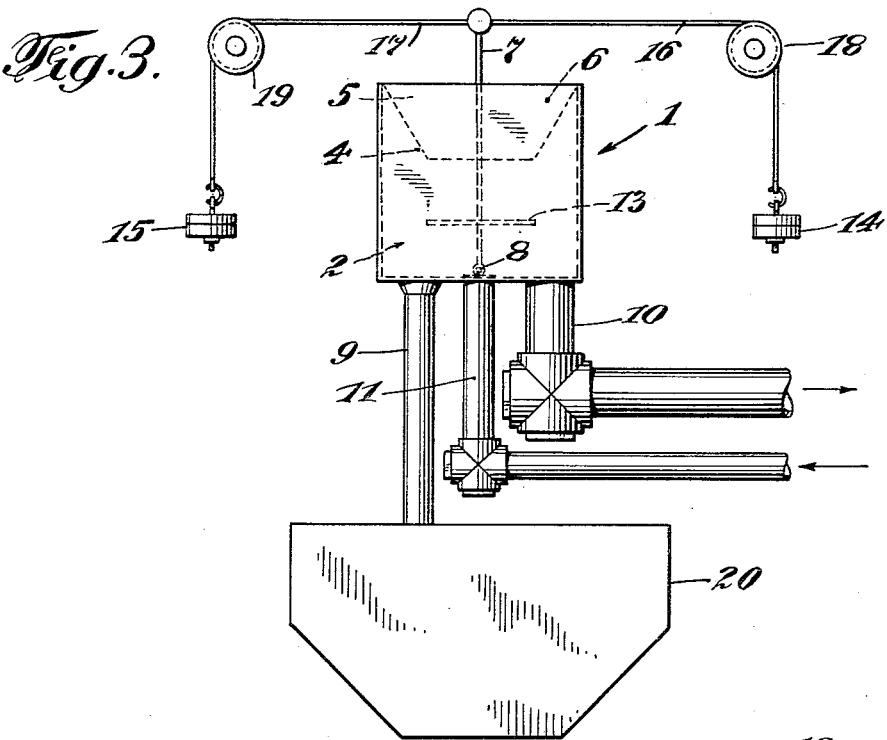
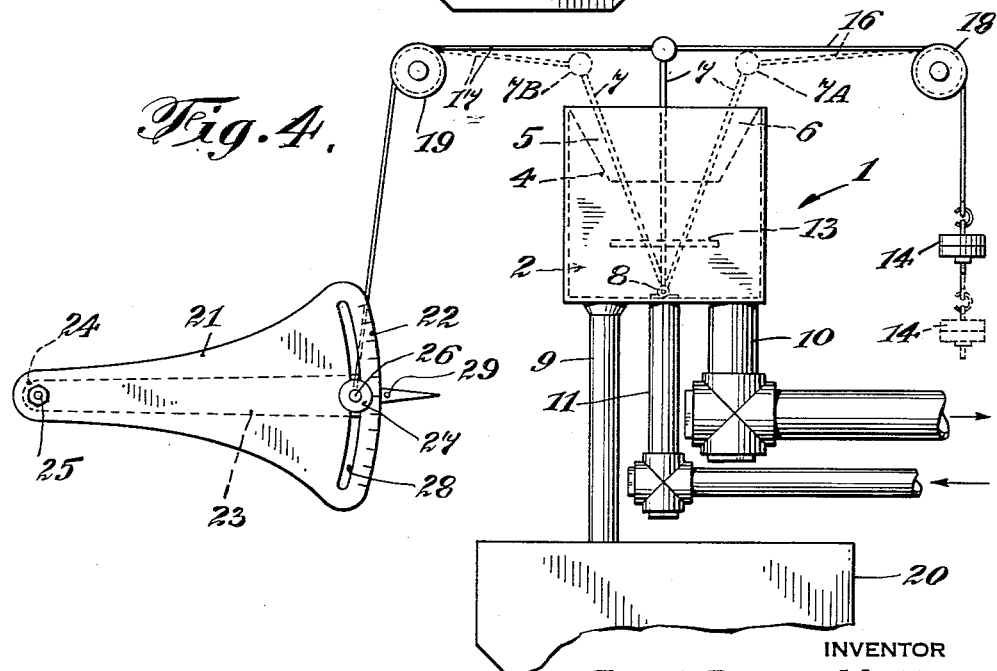
INVENTOR
Jyoti Prasad Mukherji
BY
Michael S. Striker
ATTORNEY INVENTOR
Jyoti Prasad Mukherji
BY
ATTORNEY

United States Patent Office 3,122,157
Patented Feb. 25, 1964

3,122,157
ADJUSTABLE FLUID FLOW CONTROL DEVICE
Jyoti Prasad Mukherji, Walchandnagar, Bombay, India, assignor to Walchandnagar Industries Limited, Poona, India, a public limited company of India
Filed July 28, 1960, Ser. No. 45,910
5 Claims. (Cl. 137—262)

This invention relates to an adjustable fluid flow control device.

In many manufacturing processes and operations, it is necessary to supply a fluid, which may be a liquid, a solution or a liquid suspension, at a fairly steady rate continuously. For this purpose, it is at present usual to employ a metering pump of some kind or other, or a metering device of some kind or other. The said usual devices employed are invariably expensive in first cost and require considerable attention and maintenance during use.

This invention has for its main object an improved fluid flow controlling device which, while being simple in design and inexpensive and easy to operate, will not require any special attention or maintenance during use.

A further object of this invention is a fluid flow controlling device which can be made out of corrosion-resistant materials so that it could handle corrosive fluids as well, if necessary.

With these and other objects in view, this invention consists of a fluid flow controlling device comprising a receptacle which is divided into two main compartments by a fixed vertical partition which will allow the fluid supplied to the compartment at the feed end of the device to overflow into the compartment at the delivery end of the device, and in which the said compartment at the delivery end of the device is divided into two cells by a movable partition.

In a preferred embodiment of this invention, the said movable partition is hinged to the bottom of the compartment at the delivery end of the device, about half way across the length of the said compartment. It should, however, be hinged in such a manner that while it would permit a variation of its inclination within predetermined limits, (as desired), it will always remain perpendicular to the plane of the said fixed vertical device, whatever its inclination might be.

The said movable partition should be of a height which will enable it to extend above the highest level of the fluid overflowing across the fixed vertical partition of the device.

In a device as described, the compartment at its feed end is connected to the reservoir or source from which the fluid is supplied to the device. This may be done by providing an opening either at the bottom of the said compartment or in any of the walls, e.g. the one opposite to the fixed vertical partition. A baffle plate may be provided above the said opening in order to break the surge of the incoming fluid.

One of the two cells of the compartment at the delivery end of the device should be connected, through an opening in the bottom thereof, with the destination where the fluid has to be supplied in a steady flow, and the other cell of the said compartment should be connected to the reservoir or source from which the fluid is supplied to the said device.

In an improved device according to this invention suitable means should be provided for retaining the movable partition in any desired position as long as necessary. The said means may, for instance, consist of two weights attached to the ends of ropes tied to the said partition and passing over grooved pulleys located on either side of the partition.

Alternatively, one of the said two weights may be replaced by an indicator provided with a dial having a graduated segment on which the desired position will be indicated by means of a pointer connected to the free end of the rope at the corresponding end.

These and other features of this invention will now be more particularly described with reference to the accompanying drawings, in which—

FIG. 3 is a side view of the said device as used for controlling the flow of milk of lime supplied to a continuous sulphitation equipment in the clarification of cane juice.

FIG. 4 is a side view of a modified construction of the said device.

Figure 1:
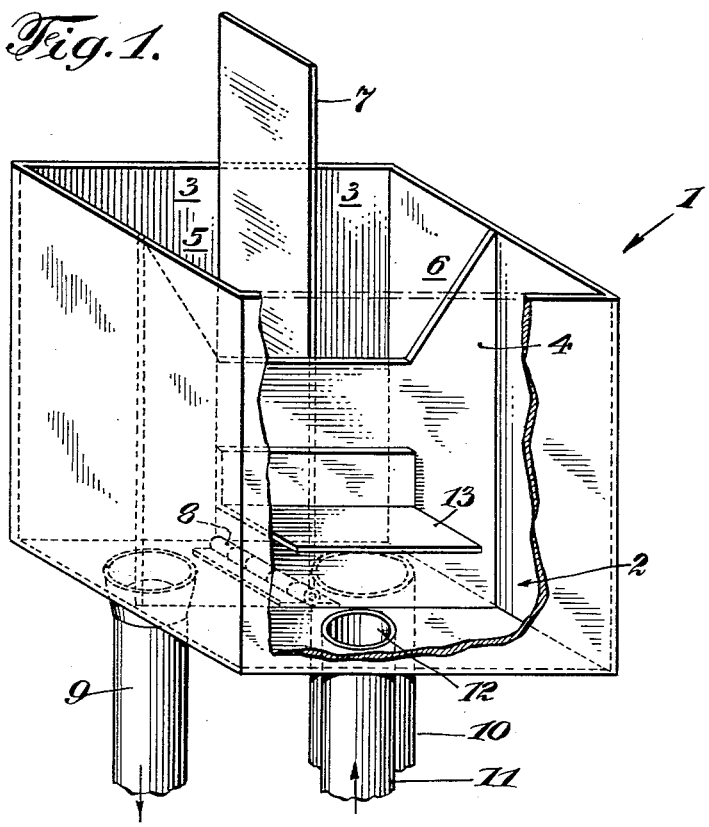
FIG. 1 is a perspective view of an improved fluid flow control device according to this invention.

The fluid flow control device illustrated in the drawings consists essentially of the receptacle 1 divided into two main compartments 2 and 3 respectively, by a fixed vertical partition 4. The height of the partition 4 is such as would permit any fluid received by compartment 2 to overflow easily into compartment 3.

The compartment 3 is again divided into two cells, 5 and 6 respectively by a movable partition 7, hinged at 8 to the bottom of the compartment 3 at about the middle of its length, so as to remain always perpendicular to the plane of the partition 4. The said partition 7 is of a height which would enable its upper edge to remain always above the highest level of the fluid overflowing across the partition 4.

Cells 5 and 6 communicate with pipe lines 9 and 10 respectively through openings provided at the bottom of the said cells.

The compartment 2 is connected to a pipe line 11 which feeds the device with the fluid, through an opening 12 provided at the bottom of the said compartment 2.

A baffle plate 13 may be provided in the compartment 2 above the opening 12 to break the surge of the incoming fluid.

The partition 7 can be held in any desired position around its axis of rotation by means of a weight 14 attached to the end of a rope 16 tied to upper edge of the partition 7 on one side thereof and passing over a grooved pulley 18.

To the upper edge of the said partition on the other side thereof is tied a rope 17, which, passing over a second grooved pulley 19 holds a weight 15 to counterbalance the weight 14.

The working of the device is as follows:

It is installed in such a way that the partition 4 is located substantially in the vertical plane. Fluid somewhat in excess of requirement is delivered into the compartment 2 of the device through the opening 12. When the compartment 2 is full, the fluid will overflow into the compartment 3 across the partition 4.

Figure 2:
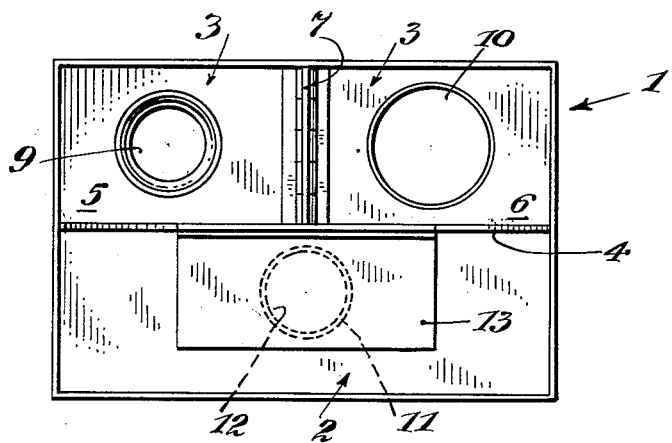
FIG. 2 is a plan of the bottom of the said device.
Figure 5:
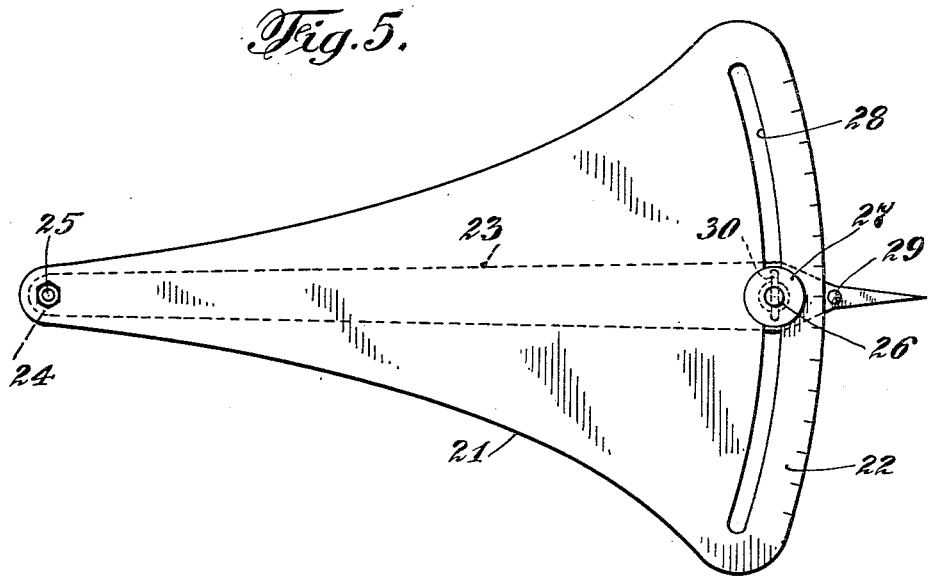
FIG. 5 is an elevation of the indicator used in the device shown in FIG. 4.
Figure 6:
FIG. 6 is its end view.
Figure 7:
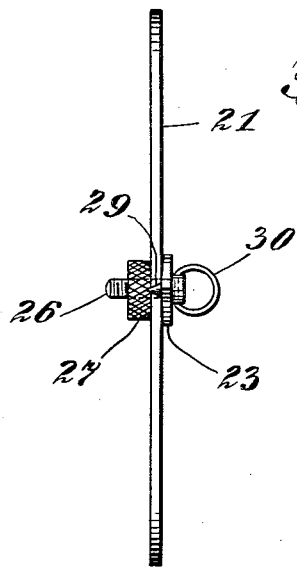
FIG. 7 is its plan.

If, for example, the hinged partition 7 is set vertically to divide the compartment 3 into two equal parts 5 and 6 as shown in FIGS. 1, 2 or 3 and it is found that the liquid received by the cell 5, which goes to the sulphitation equipment 20 through the pipe line 9 is too little, the said partition 7 is moved to the right to take up a position shown by the line 7A in FIG. 4, so that more liquid will flow into the said cell 5 and less liquid will flow into the cell 6 to be taken back by the pipe line 10 to the reservoir from which the fluid is fed into the device. The inclination of the partition 7 in its position 7A will depend upon the actual requirements in each case. When the correct position of the partition 7 is determined by observation, the counter weights 14 and 15 are adjusted so as to retain the partition in that position.

Similarly, if it is found that when the partition 7 is set vertically, too much water flows into the cell 5, the said partition 7 may be moved to the left to take up the position shown by the line 7B in FIG. 4, so that a smaller quantity of water flows into the said cell 5 and a larger quantity flows into the cell 6.

The inclination of the partition 7 may be changed manually and proper weights 14 and 15 may be used so as to retain the said partition in any desired position.

Thus, without requiring a separate controller for varying the quantity of water flowing into the cell 5, adjustments can be made most conveniently and a steady flow of any desired quantity of the liquid and neither more nor less to the sulphitation equipment, can be ensured.

FIGS. 4 to 7 illustrate a modified arrangement in which the position of the partition 7 can be regulated with the help of an indicator 21 which can be substituted for the weight 15 shown in FIG. 3.

The said indicator 21 is provided with a dial having a graduated segment 22, and a pointer 23 which at one end 24 of it is fixed to the indicator 21 by means of a hinge bolt 25 which will permit movement of the other end thereof along the graduated segment 22. A screw bolt 26 having a knurled head 27 is provided on the said pointer 23, the said bolt 26 being adapted to move in a circular slot 28 and to fix the pointer 23 in any desired position in relation to the graduated segment 22. The position of the pointer will be shown by means of a pin 29 which is adapted to move along the graduated segment 22.

A ring 30 provided at the bolt end of the said pointer 23 will facilitate the connection of the free end of the rope 17 to the said pointer 23.

It will be seen that while the device illustrated is of a simple design and easy to operate, it will not only continue to operate to supply a steady flow without requiring any special attention, but be also capable of easy adjustment by the simple operation of the movable partition.

It is to be understood that the embodiments of this invention illustrated in the drawings have been described merely by way of examples and that as regards their details variations could be made without departing from the spirit of this invention. For instance the functions of the cells 5 and 6 may be interchanged, and if desired, the opening 11 may be provided on the side of the compartment 2, e.g., opposite to the fixed vertical partition, instead of providing it at the bottom of the said compartment.

What I claim is:

1. A fluid flow controlling device comprising, in combination, a casing having a bottom wall; a fixed partition wall extending substantially normal to said bottom wall of said casing transversely through the latter and dividing said casing into two compartments, said fixed partition wall being formed with a cutout extending from a top edge thereof downwardly into said fixed partition wall for permitting fluid fed into one compartment to overflow into the other compartment; a movable partition extending substantially normal to said fixed partition wall transversely through said other compartment and dividing the latter into two cells, said movable partition being at an edge thereof adjacent said bottom wall hingedly connected to the latter along a line substantially midway between opposite edges of said bottom wall which extends transverse to said fixed partition wall so that said movable partition may be tilted from a position substantially normal to said bottom wall to a pair of end positions respectively inclined to opposite sides of a plane passing through said line and normal to said bottom wall; inlet means communicating with said one compartment; and a pair of outlet means respectively communicating with said other compartment at either side of said movable partition.

2. A fluid flow controlling device comprising, in combination, a casing having a bottom wall; a fixed partition wall extending substantially normal to said bottom wall of said casing transversely through the latter and dividing said casing into two compartments, said fixed partition wall being formed with a cutout extending from a top edge thereof downwardly into said fixed partition wall for permitting fluid fed into one compartment to overflow into the other compartment; a movable partition extending substantially normal to said fixed partition wall transversely through said other compartment and dividing the latter into two cells, said movable partition being at an edge thereof adjacent said bottom wall hingedly connected to the latter along a line substantialy midway between opposite edges of said bottom wall which extends transverse to said fixed partition wall so that said movable partition may be tilted from a position substantially normal to said bottom wall to a pair of end positions respectively inclined to opposite sides of a plane passing through said line and normal to said bottom wall; inlet means communicating through said bottom wall with said one compartment; and a pair of outlet means communicating through said bottom wall with said other compartment respectively at opposite sides of said line.

3. A fluid flow controlling device comprising, in combination, a casing having a bottom wall and two pairs of opposite side walls; a fixed partition wall extending substantially normal to said bottom wall of said casing transversely through the latter between one pair of said opposite side walls and dividing said casing into two compartments, said fixed partition wall being formed with a cutout defined by a pair of side edges and a bottom edge extending spaced from and substantially parallel to said bottom wall, said side edges extending respectively from top edges of said one pair of side walls and including an angle with each other so that continuation of said side edges intersect each other at a point of said bottom wall equally spaced from each of said one pair of side walls for permitting fluid fed into one compartment to overflow into the other compartment; a movable partition extending substantially normal to said fixed partition wall transversely through said other compartment and dividing the latter into two cells, said movable partition being at an edge thereof adjacent said bottom wall hingedly connected to the latter along a line substantially midway between opposite edges of said bottom wall which extends transverse to said fixed partition wall so that said movable partition may be tilted from a position substantially normal to said bottom wall to a pair of end positions in which an upper portion of said movable partition extends respectively along said side edges of said cutout; inlet means communicating through said bottom wall with said one compartment; a pair of outlet means respectively communicating through said bottom wall with said other compartment respectively at opposite sides of said line; and means operatively connected to said movable partition to move the latter between said end positions thereof and to hold the latter in a fixed position in either of said end positions as well as in any tilted position between said end positions.

4. A fluid flow controlling device as set forth in claim 3, and including indicating means operatively connected to said means for moving said movable partition and for holding the same in any position to which it is moved for indicating the inclination of said movable partition.

5. A fluid flow controlling device as set forth in claim 3, and including a baffle plate extending spaced from and substantially parallel to said bottom wall over said inlet means.

References Cited in the file of this patent

UNITED STATES PATENTS

| | | |
|---|---|---|
| 279,530 | Boynton | June 19, 1883 |
| 1,181,726 | Bishop | May 2, 1916 |
| 1,621,022 | | |
| 1,839,430 | | |
| 1,884,804 | | |
| 2,582,523 | | |
| 2,625,952 | | |
| | Merchen | Mar. 15, 1927 |
| | Weber | Jan. 5, 1932 |
| | Millington | Oct. 25, 1932 |
| | Beglinger | Jan. 15, 1952 |
| | Eide | Jan. 20, 1953 |

FOREIGN PATENTS

| | | |
|---|---|---|
| 194,672 | Great Britain | May 8, 1924 |